(12) United States Patent
Choi

(10) Patent No.: US 8,496,855 B2
(45) Date of Patent: Jul. 30, 2013

(54) CATHODE ACTIVE MATERIAL, CATHODE INCLUDING CATHODE ACTIVE MATERIAL, AND LITHIUM BATTERY INCLUDING CATHODE

(75) Inventor: Won-chang Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 377 days.

(21) Appl. No.: 12/837,689

(22) Filed: Jul. 16, 2010

(65) Prior Publication Data

US 2011/0017946 A1 Jan. 27, 2011

(30) Foreign Application Priority Data

Jul. 27, 2009 (KR) .................. 10-2009-0068409
Dec. 3, 2009 (KR) .................. 10-2009-0119109

(51) Int. Cl.
*H01M 4/88* (2006.01)
(52) U.S. Cl.
USPC .................. 252/518.1; 252/519.1; 252/521.2; 429/122
(58) Field of Classification Search
USPC ...... 252/182.1, 518.1, 519.1, 521.2; 429/122, 429/489
See application file for complete search history.

(56) References Cited

U.S. PATENT DOCUMENTS

| | | | |
|---|---|---|---|
| 5,631,104 A | 5/1997 | Zhong et al. | |
| 6,337,158 B1 | 1/2002 | Nakajima et al. | |
| 6,458,488 B1 | 10/2002 | Honbo et al. | |
| 7,011,907 B2 * | 3/2006 | Noguchi et al. | 429/223 |
| 7,026,070 B2 | 4/2006 | Noguchi et al. | |
| 7,179,566 B2 | 2/2007 | Kawasaki et al. | |
| 2004/0185345 A1 | 9/2004 | Kawasaki et al. | |
| 2008/0280203 A1 * | 11/2008 | Yada et al. | 429/220 |

FOREIGN PATENT DOCUMENTS

| | | |
|---|---|---|
| JP | 2001-048547 | 2/2001 |
| JP | 2001-319653 | * 11/2001 |
| JP | 2002-015738 | 1/2002 |
| JP | 2002-373655 | 12/2002 |
| JP | 2003-229130 | 8/2003 |
| JP | 2003-263983 | 9/2003 |
| JP | 2003-317718 | 11/2003 |
| JP | 2004-171909 | 6/2004 |
| JP | 2008-235151 | 10/2008 |
| KR | 10-2006-0003745 A | 1/2006 |
| KR | 10-2006-0122450 A | 11/2006 |
| KR | 10-2006-0130964 A | 12/2006 |
| KR | 10-2008-0105637 A | 12/2008 |

* cited by examiner

*Primary Examiner* — Mark Kopec
*Assistant Examiner* — William Young
(74) *Attorney, Agent, or Firm* — Cantor Colburn LLP

(57) ABSTRACT

A cathode active material including a spinel lithium manganese composite oxide represented by Formula 1 below, a cathode including the cathode active material, and a lithium battery including the cathode:

$$Li_xMn_{2-y-z}Ni_yM_zO_{4-n}X_n \qquad <Formula\ 1>$$

where $0.025 \leq x \leq 1.1$, $0.3 \leq y < 0.5$, $0 < z \leq 0.15$, and, $0 < n \leq 1$;
M is a transition metal; and
X is a halogen element.

17 Claims, 1 Drawing Sheet

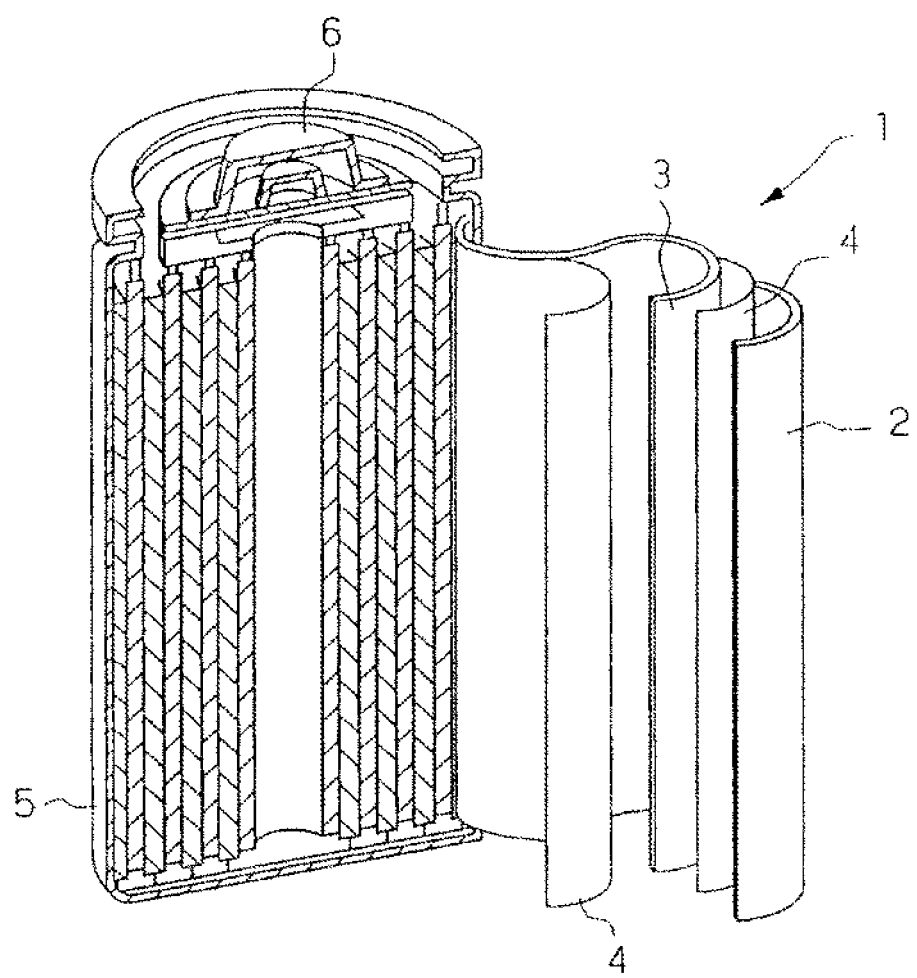

CATHODE ACTIVE MATERIAL, CATHODE INCLUDING CATHODE ACTIVE MATERIAL, AND LITHIUM BATTERY INCLUDING CATHODE

CROSS-REFERENCE TO RELATED APPLICATIONS

This application claims the benefit of Korean Patent Application No. 10-2009-0068409, filed on Jul. 27, 2009, and Korean Patent Application No. 10-2009-0119109, filed on Dec. 3, 2009, in the Korean Intellectual Property Office, the disclosures of which are incorporated herein by reference.

BACKGROUND

1. Field

Aspects of the present disclosure relate to cathode active materials, cathodes including the cathode active materials, and lithium batteries including the cathodes.

2. Description of the Related Art

In line with the development of smaller and higher-performing devices, high-energy-density, in addition to miniaturization and light weight, has been regarded as an important factor for lithium batteries. In addition, in order to be applied to electric vehicles, the cycle characteristics at room temperature and high temperature have also been regarded as important factors for lithium batteries. To manufacture such lithium batteries, research for various cathode active materials has been undertaken.

Lithium cobalt oxides are commonly used as cathode active materials. However, lithium cobalt oxides are expensive, the effective capacity of lithium cobalt oxides is 50% of the theoretical capacity, and the driving voltage of lithium cobalt oxides is about 4 V. Examples of lithium cobalt oxides include $LiCoO_2$.

Lithium manganese oxides have an effective capacity similar to that of lithium cobalt oxides and a driving voltage of about 4 V, and are inexpensive and stable. However, lithium manganese oxides have poor cycle characteristics. Examples of lithium manganese oxides include $LiMn_2O_4$.

Spinel compounds formed by substituting some manganese contained in lithium manganese oxides with other metals generate a high voltage of about 5 V. Such spinel compounds have poor cycle characteristics at high temperature. Examples of such spinel compounds include $LiNi_{0.5}Mn_{1.5}O_4$.

Thus, there is a need to develop a cathode active material that produces a high voltage and has excellent cycle characteristics at room temperature and high temperature.

SUMMARY

Novel cathode active materials, cathodes including the cathode active materials and lithium batteries including the cathodes are provided.

According to an aspect of the present invention, a cathode active material includes a spinel lithium manganese composite oxide represented by Formula 1 below:

$$Li_xMn_{2-y-z}Ni_yM_zO_{4-n}X_n \qquad \text{<Formula 1>}$$

where $0.025 \leq x \leq 1.1$, $0.3 \leq y < 0.5$, $0 < z \leq 0.15$, and, $0 < n \leq 1$; M is a metal selected from the group consisting of gallium (Ga), zirconium (Zr), niobium (Nb), molybdenum (Mo), tungsten (W), barium (Ba), calcium (Ca), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As); and X is a halogen element selected from the group consisting of fluorine (F), chloride (Cl), bromine (Br), and iodine (I).

According to another aspect of the present invention, a cathode includes the cathode active material.

According to another aspect of the present invention, a lithium battery includes the cathode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawing of which:

FIG. 1 is a schematic view of a lithium battery according to an embodiment of the present invention.

DETAILED DESCRIPTION

Reference will now be made in detail to the present embodiments of the present invention, an example of which is illustrated in the accompanying drawing, wherein like reference numerals refer to the like elements throughout. The embodiments are described below in order to explain the present invention by referring to the FIGURES. Hereinafter, one or more embodiments of a cathode active material, a cathode including the cathode active material, and a lithium battery including the cathode will be described in greater detail.

A cathode active material according to an embodiment may include a spinel lithium manganese composite oxide represented by Formula 1:

$$Li_xMn_{2-y-z}Ni_yM_zO_{4-n}X_n \qquad \text{<Formula 1>}$$

where $0.025 \leq x \leq 1.1$, $0.3 \leq y < 0.5$, $0 < z \leq 0.15$, and, $0 < n \leq 1$; M is a metal selected from the group consisting of gallium (Ga), zirconium (Zr), niobium (Nb), molybdenum (Mo), tungsten (W), barium (Ba), calcium (Ca), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As); and X is a halogen element selected from the group consisting of fluorine (F), chloride (Cl), bromine (Br), and iodine (I). M may be selected from transition metal elements, other than Ca, having a higher atomic weight than Mn. For example, M may be gallium (Ga), zirconium (Zr), niobium (Nb), molybdenum (Mo), or tungsten (W).

In the spinel lithium manganese composite oxide, $0.3 \leq y < 0.5$ or $0.4 \leq y < 0.5$, where y is the amount of nickel. When $0.3 \leq y < 0.5$, a high discharge capacity, excellent cycle characteristics are obtained at high-temperature and low-temperature.

When y is 0.5 or more, an additional impurity phase or secondary phase of the spinel lithium manganese composite oxide may be formed in the cathode active material. When the additional impurity phase of the spinel lithium manganese composite oxide is formed, $Mn^{3+}$ may remain in the cathode active material, and the presence of $Mn^{3+}$ may lead to a decrease in high-temperature cycle characteristics of a lithium battery including the cathode active material. Also, since nickel is involved in charging and discharging reactions, the discharge capacity of the lithium battery may be reduced. When y is 0.3 or less, the cathode active material may have an unstable structure due to a shortage of oxygen anion. In addition, since the amount of nickel in the spinel lithium manganese composite oxide is directly related to the electric capacity, when y is less than 0.3, the capacity of the spinel lithium manganese composite oxide at 4.7 V is substantially reduced and the capacity of the spinel lithium manganese composite oxide at an undesired voltage, for example, 4.0 V, may occur.

In the spinel lithium manganese composite oxide, during electrochemical charging and discharging, the amount of lithium, that is, x, may be equal to or greater than 0.025 and equal to or less than 1.1, whereas before charging and discharging, the amount of lithium, x, may be equal to or greater than 1.0 and equal to or less than 1.1. In particular, during electrochemical charging and discharging, x may be greater than 1.0 and equal to or less than 1.1. Although x may be 1 in a conventional spinel lithium manganese composite oxide used in a cathode active material, according to the present embodiment, x in the spinel lithium manganese composite oxide of Formula 1 may be more than 1. A part or all of such excess lithium corresponds to the reduced Mn. In other words, manganese is substituted with at least a part of the excess lithium.

In the spinel lithium manganese composite oxide, the substitution amount of M, that is, z, may be greater than 0 and equal to or smaller than 0.15, in particular, $0<z\leq0.10$. M may be included in the substitution amount range described above in the spinel lithium manganese composite oxide. If M is greater than 0.15, a secondary phase may be formed due to M and thus electrochemical characteristics of the cathode active material may be degraded.

In the spinel lithium manganese composite oxide, the substitution amount of the halogen (X), that is, n, may be greater than 0 and equal to or smaller than 1, in particular, $0<n\leq0.5$. Some oxygen in the spinel structure may be substituted with a halogen element. Due to the substitution with the halogen element, the charge and discharge capacity of a lithium battery may be increased and, due to the M-X bond, which is a stronger ionic bonding than the M-O bond, high structural stability and high chemical resistance may be obtained and thus the high-temperature cycle characteristics of a lithium battery may be even more improved.

The cathode active material according to the present embodiment may be formed by sintering a mixture including a lithium source, a nickel source, a manganese source, an M source, and a halogen source. For example, the cathode active material may be formed by using a method including: mixing a lithium source, a nickel source, a manganese source, an M source, and a halogen source in a given mole ratio; dissolving the mixture in water; adding an additive thereto to prepare a mixed solution; first sintering the mixed solution at a temperature of about 400 to about 600° C. for about 2 hours to about 5 hours under an oxygen atmosphere; and then sintering the first sintered product at a temperature of about 900 to about 1100° C. for about 12 hours to about 36 hours under an oxygen atmosphere.

The first sintering temperature may be, for example, 500° C., and the second sintering temperature may be, for example, 1000° C. The additive may be, for example, a mixed solution including citric acid and ethylene glycol in a mole ratio of 1:4, but is not limited thereto. For example, the additive may be any additive that is used in the related art.

In detail, the spinel lithium manganese composite oxide represented by Formula 1 may be represented by one of Formulae 2 through 5 below:

$$Li_xMn_{2-y-z}Ni_yM_zO_{4-n}F_n \qquad \text{<Formula 2>}$$

where $0.025\leq x\leq1.1$, $0.3\leq y<0.5$, $0<z\leq0.15$, and $0<n\leq1$; and M is selected from the group consisting of gallium (Ga), zirconium (Zr), niobium (Nb), molybdenum (Mo), tungsten (W), barium (Ba), calcium (Ca), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As).

Despite the cation and anion substitution with M and F, cycle characteristics at room temperature may not be degraded. In addition, despite the anion substitution with F, charge and discharge characteristics during high-rate discharging may not be degraded.

In Formula 2, the amount of lithium, that is, x, may be equal to or greater than 1.0 and equal to or smaller than 1.1. In addition, the amount of M, that is, z, may be greater than 0 and equal to or smaller than 0.10, and the amount of F, that is, n, may be greater than 0 and equal to or smaller than 0.15. A lithium battery including the cathode active material including such concentration ranges of components may have excellent high-temperature cycle characteristics.

$$Li_xMn_{2-y-z}Ni_yM_zO_{4-n}Cl_n \qquad \text{<Formula 3>}$$

where $0.025\leq n\leq1.1$, $0.3\leq y<0.5$, $0<z\leq0.15$, and $0<n\leq1$; and M is selected from the group consisting of gallium (Ga), zirconium (Zr), niobium (Nb), molybdenum (Mo), tungsten (W), barium (Ba), calcium (Ca), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As).

$$Li_xMn_{2-y-z}Ni_yM_zO_{4-n}Br_n \qquad \text{<Formula 4>}$$

where $0.025\leq x\leq1.1$, $0.3\leq y<0.5$, $0<z\leq0.15$, and $0<n\leq1$; and M is selected from the group consisting of gallium (Ga), zirconium (Zr), niobium (Nb), molybdenum (Mo), tungsten (W), barium (Ba), calcium (Ca), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As).

$$Li_xMn_{2-y-z}Ni_yM_zO_{4-n}I_n \qquad \text{<Formula 5>}$$

where $0.025\leq x\leq1.1$, $0.3\leq y<0.5$, $0<z\leq0.15$, and $0<n\leq1$; and M is selected from the group consisting of gallium (Ga), zirconium (Zr), niobium (Nb), molybdenum (Mo), tungsten (W), barium (Ba), calcium (Ca), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As).

The cathode active material of Formula 2 may be formed by sintering a mixture including a lithium source, a nickel source, a manganese source, an M source, and a fluorine source. For example, the cathode active material may be formed by using a method including: mixing a lithium source, a nickel source, a manganese source, an M source, and a fluorine source in a given mole ratio; dissolving the mixture in water; adding an additive thereto to prepare a mixed solution; first sintering the mixed solution at a temperature of about 400 to about 600° C. for about 2 hours to about 5 hours under an oxygen atmosphere; and then sintering the first sintered product at a temperature of about 900 to about 1100° C. for about 12 hours to about 36 hours under an oxygen atmosphere.

The first sintering temperature may be, for example, 500° C., and the second sintering temperature may be, for example, 1000° C. The additive may be, for example, a mixed solution including citric acid and ethylene glycol in a mole ratio of 1:4, but is not limited thereto. For example, the additive may be any additive that is used in the related art.

The cathode active materials of Formulae 3 through 5 may also be manufactured in the same manner as described above.

Additional embodiments include a cathode incorporating the above-described cathode active material. The cathode may be manufactured as follows. First, a cathode active material, a conducting agent, a binder, and a solvent are mixed to prepare a cathode active material composition. The cathode active material composition is directly coated on an aluminum current collector and dried to prepare a cathode plate. Alternatively, the cathode active material composition may be cast on a separate support, and then the cathode active material film separated from the support may be laminated on an aluminum current collector to prepare a cathode plate.

Examples of the conducting agent may include carbon black, graphite particulates, natural graphite, artificial graphite, acetylene black, ketjen black, and carbon fibers; metallic materials, such as copper, nickel, aluminum, silver, etc., in powder or fiber form; and polyphenylene derivatives.

Examples of the binder include a vinylidene fluoride/hexafluoropropylene copolymer, polyvinylidene fluoride (PVDF), polyacrylonitrile, polymethylmethacrylate, polytetrafluoroethylene, mixtures of these five materials, and a styrene butadiene rubber polymer. Examples of the solvent may include N-methyl-pyrrolidone (NMP), acetone, water, etc. Here, the amounts of the cathode active material, the conducting agent, the binder, and the solvent used in the manufacture of the lithium battery are amounts generally used in the art.

Additional embodiments include a lithium battery including the cathode. The lithium battery may be manufactured as follows. First, a cathode including a cathode active material is manufactured as described above. Next, similarly to the manufacturing of the cathode plate described above, an anode active material, a conducting agent, a binder, and a solvent are mixed to prepare an anode active material composition. The anode active material composition is directly coated on a copper current collector to prepare an anode plate. Alternatively, the anode active material composition may be cast on a separate support, and then the anode active material film separated from the support may be laminated on a copper current collector to prepare an anode plate.

Any anode active material commonly used in the art may be used without limitation. Examples of available anode active materials may include lithium metal, a metal that is alloyable with lithium, a transition metal oxide, a material that allows doping or undoping of lithium, a material that allows irreversible intercalation and deintercalation of lithium ions, etc.

Examples of the transition metal oxide may include a tungsten oxide, a molybdenum oxide, a titanium oxide, a lithium titanium oxide, a vanadium oxide, a lithium vanadium oxide, etc. The material that allows doping or undoping of lithium may be, for example, silicon (Si), $SiO_x(0<x<2)$, Si—Y alloy (Y is an alkaline metal, an alkaline earth metal, a Group 13 element, a Group 14 element, a transition metal, rare earth element, or a combination thereof and is not Si), tin (Sn), $SnO_2$, Sn—Y (Y is an alkaline metal, an alkaline earth metal, a Group 13 element, a Group 14 element, a transition metal, a rare earth element, or a combination thereof and is not Sn), or a mixture formed by mixing $SiO_2$ and at least one of these. Y may be magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Rh), iridium (Ir), palladium (Pd), platinum (Pt), copper (Co), silver (Ag), gold (Au), zinc (Zn), cadmium (Cd), boron (B), aluminium (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), or a combination thereof.

The material that allows reversible intercalation and deintercalation of lithium ions may be a carbonaceous material, and may be any carbonaceous anode active material that is commonly used in lithium batteries. Examples of the carbonaceous material may include crystalline carbon, amorphous carbon, or mixtures thereof. Examples of the crystalline carbon may include natural graphite or artificial graphite that are in amorphous, plate, flake, spherical or fibrous form. Examples of the amorphous carbon may include soft carbon (carbon sintered at low temperatures), hard carbon, mesophase pitch carbides, sintered cokes, etc.

The conducting agent, the binder, and the solvent in the anode active material composition are the same as those in the cathode active material composition. In some cases, the cathode active material composition and the anode active material composition may further include a plasticizer in order to form pores in the anode or cathode plate. Here, the amounts of the anode active material, the conducting agent, the binder, and the solvent used in the manufacture of the lithium battery are amounts generally used in the art.

The cathode plate and the anode plate may be separated from each other by a separator. Any separator that is commonly used for lithium batteries may be used. In one embodiment, the separator may have low resistance to migration of ions in an electrolyte and high electrolyte-retaining ability. Examples of the separator include glass fiber, polyester, polyethylene, polypropylene, polytetrafluoroethylene (PTFE), and a combination thereof, each of which may be a nonwoven fabric or a woven fabric. For example, a windable separator including polyethylene, polypropylene, or the like may be used for a lithium ion battery. A separator that may retain a large amount of an organic electrolytic solution may be used for a lithium-ion polymer battery.

A method of manufacturing a separator such as referred to above will now be described in more detail. A polymer resin, a filler, and a solvent are mixed to prepare a separator composition. Then, the separator composition may be directly coated on an electrode, and then dried to form a separator film. Alternatively, the separator composition may be cast on a support and then dried to form a separator composition film, and the separator composition film exfoliated from the support may then be laminated on an electrode to form a separator film.

The polymer resin is not particularly limited and may be any material that is used as a binder for an electrode plate. Examples of the polymer resin include vinylidenefluoride/hexafluoropropylene copolymer, polyvinylidenefluoride, polyacrylonitrile, polymethylmethacrylate, and mixtures thereof. For example, the polymer resin may be a vinylidenefluoride/hexafluoropropylene copolymer having 8 to 25 wt % of hexafluoropropylene.

Referring to FIG. 1, a lithium battery 1 may include a cathode 3, an anode 2, and a separator 4. The cathode 3, the anode 2, and the separator 4 are wound or folded and placed in a battery case 5. Subsequently, an organic electrolytic solution is injected into the battery case 5 and the resultant structure is sealed with a cap assembly 6, thereby completing manufacture of the lithium battery 1. The battery case 5 may have a cylindrical, rectangular, or thin-film form. The lithium battery 1 may be, for example, a thin-film type battery or a lithium ion battery.

Alternatively, a battery assembly may be formed by placing a separator 4 between a cathode 3 and an anode 2. A plurality of the battery assemblies may be stacked in a multi-cell structure and then the multi-cell structure is immersed in an organic electrolytic solution and placed into a pouch and sealed, thereby completing manufacture of a lithium ion polymer battery.

Examples of the organic electrolyte solution may include a mixed organic solvent containing a lithium salt, a solvent having a high dielectric constant (hereinafter, referred to as "high-dielectric constant solvent"), and a solvent having a low boiling point (hereinafter, referred to as "low-boiling point solvent").

The high-dielectric constant solvent may be any solvent that is conventionally used in the art without limitation. Examples of the high-dielectric solvent include cyclic carbonates, such as ethylene carbonate, propylene carbonate, or 1,2-butylene carbonate, and gamma-butyrolactone.

The low-boiling point solvent may also be any solvent that is conventionally used in the art without limitation. Examples of the low-boiling point solvent include chain type carbonates, such as dimethyl carbonate, ethylmethyl carbonate, diethyl carbonate, or di-n-propyl carbonate, 1,2-dimethoxyethane, 1,2-diethoxyethane, and aliphatic ester derivatives. However, the low-boiling-point solvent is not limited thereto.

The volumetric ratio of the high-dielectric constant solvent to the low-boiling point solvent may be in the range from 1:1 to 1:9 in terms of the discharge capacity and charge/discharge cycle life of the lithium battery.

Also, the lithium salt used in the electrolytic solution may be any lithium salt that is conventionally used in lithium batteries. The lithium salt may include at least one compound selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$.

The concentration of the lithium salt in the organic electrolyte solution may be about 0.5 to about 2 M. When the concentration of the lithium salt is less than 0.5 M, the organic electrolyte solution may have low conductivity, and thus may have poor performance. When the concentration of the lithium salt is greater than 2.0 M, the viscosity of the organic electrolyte solution is high, and thus the mobility of lithium ions may be reduced.

The lithium battery may be used in mobile phones, portable computers, and applications requiring high capacity, high performance, and a high-temperature operating environment, such as electric vehicles. The lithium battery may also be used in hybrid vehicles when combined with existing internal combustion engines, fuel cells, or super capacitors. In addition, the lithium battery may also be used in other applications requiring high performance, high voltage, and a high-temperature operating environment.

Hereinafter, one or more embodiments will be described in detail with reference to the following examples. However, these examples are not intended to limit the purpose and scope of the one or more embodiments.

SYNTHESIS OF CATHODE ACTIVE MATERIAL

Comparative Example 1

Synthesis of $LiNi_{0.5}Mn_{1.5}O_4$ $Li_2CO_3$ powder, $Ni(CH_3CO_2)_2$ powder, and $Mn(CH_3CO_2)_2$ powder as starting materials were mixed in a mole ratio of 0.5:0.5:1.5 and dissolved in water to prepare a solution. Then, an additive, which is a mixture of citric acid and ethylene glycol in a mole ratio of 1:4, was added to the solution to prepare a mixed solution. The mixed solution was first sintered at a temperature of 500° C. for 3 hours under an oxygen atmosphere, and then sintered at a temperature of 1000° C. for 24 hours under an oxygen atmosphere and then, cooled at a rate of 1° C. per minute, thereby synthesizing $LiNi_{0.5}Mn_{1.5}O_4$, which is a cathode active material powder.

Comparative Example 2

Synthesis of $Li_{1.05}Ni_{0.5}Mn_{1.5}O_{3.9}F_{0.1}$ $Li_{1.05}Ni_{0.5}Mn_{1.5}O_{3.9}F_{0.1}$ was synthesized in the same manner as in Comparative Example 1, except that $Li_2CO_3$ powder, $Ni(CH_3CO_2)_2$ powder, $Mn(CH_3CO_2)_2$ powder, and LiF powder as starting materials were mixed in a mole ratio of 0.475: 0.5:1.5:0.1.

Comparative Example 3

Synthesis of $Li_{1.05}Ni_{0.45}Mn_{1.45}Nb_{0.05}O_4$ $Li_{1.05}Ni_{0.45}Mn_{1.45}Nb_{0.05}O_4$ was synthesized in the same manner as in Comparative Example 1, except that $Li_2CO_3$ powder, $Ni(CH_3CO_2)_2$ powder, $Mn(CH_3CO_2)_2$ powder, and $Nb(Cl)_5$ powder as starting materials were mixed in a mole ratio of 0.525:0.45:1.45:0.05.

Comparative Example 4

Synthesis of $Li_{1.1}Ni_{0.45}Mn_{1.4}W_{0.05}O_4$ $Li_{1.1}Ni_{0.45}Mn_{1.4}W_{0.05}O_4$ was synthesized in the same manner as in Comparative Example 1, except that $Li_2CO_3$ powder, $Ni(CH_3CO_2)_2$ powder, $Mn(CH_3CO_2)_2$ powder, and $(NH_4)_{10}[H_2W_{12}O_{42}]$ powder as starting materials were mixed in a mole ratio of 0.55:0.45:1.40:0.0042.

Example 1

Synthesis of $Li_{1.1}Ni_{0.45}Mn_{1.4}Nb_{0.05}O_{3.95}F_{0.05}$ $Li_{1.1}Ni_{0.45}Mn_{1.4}Nb_{0.05}O_{3.95}F_{0.05}$ was synthesized in the same manner as in Comparative Example 1, except that $Li_2CO_3$ powder, $Ni(CH_3CO_2)_2$ powder, $Mn(CH_3CO_2)_2$ powder, $Nb(Cl)_5$ powder, and LiF powder as starting materials were mixed in a mole ratio of 0.525:0.45:1.4:0.05:0.05.

Example 2

Synthesis of $Li_{1.1}Ni_{0.45}Mn_{1.4}W_{0.05}O_{3.95}F_{0.05}$ $Li_{1.1}Ni_{0.45}Mn_{1.4}W_{0.05}O_{3.95}F_{0.05}$ was synthesized in the same manner as in Comparative Example 1, except that $Li_2CO_3$ powder, $Ni(CH_3CO_2)_2$ powder, $Mn(CH_3CO_2)_2$ powder, $(NH_4)_{10}[H_2W_{12}O_{42}]$ powder, and LiF powder as starting materials were mixed in a mole ratio of 0.525:0.45:1.4:0.0042:0.05.

Example 3

Synthesis of $Li_{1.1}Ni_{0.45}Mn_{1.4}Zr_{0.05}O_{3.95}F_{0.05}$ $Li_{1.1}Ni_{0.45}Mn_{1.4}Zr_{0.05}O_{3.95}F_{0.05}$ was synthesized in the same manner as in Comparative Example 1, except that $Li_2CO_3$ powder, $Ni(CH_3CO_2)_2$ powder, $Mn(CH_3CO_2)_2$ powder, $Zr(C_3H_7O)_4$ powder, and LiF powder as starting materials were mixed in a mole ratio of 0.525:0.45:1.4:0.05:0.05.

Example 4

Synthesis of $Li_{1.1}Ni_{0.45}Mn_{1.4}Mo_{0.05}O_{3.95}F_{0.05}$ $Li_{1.1}Ni_{0.45}Mn_{1.4}Mo_{0.05}O_{3.95}F_{0.05}$ was synthesized in the same manner as in Comparative Example 1, except that $Li_2CO_3$ powder, $Ni(CH_3CO_2)_2$ powder, $Mn(CH_3CO_2)_2$ powder, $(NH_4)_6Mo_7O_{24}$ powder, and LiF powder as starting materials were mixed in a mole ratio of 0.525:0.45:1.4:0.0071:0.05.

MANUFACTURE OF LITHIUM BATTERY

Comparative Example 5

Manufacture of Lithium Half Battery

The cathode active material powder prepared according to Comparative Example 1 and a carbonaceous conducting agent (Ketjenblack EC-600JD, AkzoNobel) were homogenously mixed in a weight ratio of 96:1.5, and then, a PVDF binder solution was added thereto to prepare slurry including the active material, the carbonaceous conducting agent, and the PVdF binder in a weight ratio of 96:1.5:2.5.

The slurry was coated on an aluminum foil having a thickness of 15 μm and then dried to prepare a cathode plate and then additionally dried to manufacture a coin cell (CR type). In this experiment, a metallic lithium electrode was used as a counter electrode and 1.3 M $LiPF_6$ in ethylene carbonate (EC):diethyl carbonate (DEC) (3:7) weight ratio was used as an electrolyte.

Comparative Examples 6 to 8 and Examples 5 to 8

Manufacture of Lithium Half Battery

Lithium half batteries were manufactured in the same manner as in Comparative Example 3, except that the cathode active material powders of Comparative Examples 2 through 4 and Examples 1 through 4 were used instead of the cathode active material powder of Comparative Example 1.

EVALUATION EXAMPLE 1

Charging-Discharging Test at Room Temperature

Charging and discharging tests were performed using the lithium half batteries prepared according to Comparative Examples 5 to 8 and Examples 5 to 8 at a temperature of 25° C.

Charging and discharging tests were performed under the following conditions. During the 1$^{st}$ to 5$^{th}$ cycles, charging was performed with a constant current of 0.5 C until the voltage reached 4.9 V, and then charging was performed with a constant voltage of 4.9 V until the current was reduced to 0.1 C. Discharging was performed with a constant current of 0.2 C until the voltage reached 3.5 V. During the 6$^{th}$ cycle, charging was performed using the same method as used in the fifth cycle. Then discharging was performed at a constant current of 2 C to measure the high-rate characteristics. During the subsequent cycle, charging was performed with a constant current of 1 C until the voltage reached 4.9 V, and then charging was performed with a constant voltage of 4.9 V until the current was decreased to 0.1 C. Discharging was performed with a constant current of 1 C until the voltage was reduced to 3.5 V. This charging and discharging operation was repeatedly performed 100 times. The results are shown in Table 1 below. In Table 1, a capacity retention rate and the high-rate characteristics are defined as in Equations 1 and 2.

Capacity retention rate (%)=discharge capacity at the 1$^{st}$ cycle/discharge capacity at the 100$^{th}$ cycle     <Equation 1>

High-rate characteristics (%)=discharge capacity at the 6$^{th}$ cycle (2 C)/discharge capacity at the 5$^{th}$ cycle (0.2 C)     <Equation 2>

TABLE 1

|  | Capacity retention rate[%] | High-rate characteristics[%] |
| --- | --- | --- |
| Comparative Example 5 | 87.0 | 91.6 |
| Comparative Example 6 | 86.2 | 89.7 |
| Comparative Example 7 | 87.3 | 89.7 |
| Comparative Example 8 | 84.8 | 85.7 |
| Example 5 | 86.5 | 92.3 |
| Example 6 | 85.0 | 84.3 |
| Example 7 | 86.2 | 90.1 |
| Example 8 | 89.7 | 92.9 |

As shown in Table 1, the lithium half batteries prepared according to Comparative Examples 5 to 8 and Examples 5 to 8 had high capacity retention rates and excellent high-rate characteristics.

EVALUATION EXAMPLE 2

Charging-Discharging Tests at High Temperature

Charging and discharging tests were performed using the lithium half batteries prepared according to Comparative Examples 5 to 8 and Examples 5 to 8 at high temperature of 45° C.

Before charging and discharging tests were performed at high temperature, charging was performed with a constant current of 0.5 C until the voltage reached 4.9 V, and then charging was performed with a constant voltage of 4.9 V until the current was reduced to 0.1 C. Discharging was performed with a constant voltage of 0.2 C until the voltage reached 3.5 V. This charging and discharging operation for performing formation was repeatedly performed five times at room temperature.

Then, charging and discharging tests were performed at high temperature of 45° C. under the same charging and discharging conditions as used at room temperature. The charging and discharging conditions at high temperature are as follows. Charging was performed with a constant current of 1 C until the voltage reached 4.9 V, and then charging was performed with a constant voltage of 4.9 V until the current was reduced to 0.1 C. Discharging was performed with a constant current of 1 C until the voltage reached 3.5 V. This high-temperature charging and discharging test was performed 30 times. The results are shown in Table 2 below. In Table 2, the high-temperature capacity retention rate is defined by Equation 3 below.

High-temperature capacity retention rate (%)=discharge capacity at high temperature at the 30$^{th}$ cycle/discharge capacity at high temperature at the 1$^{st}$ cycle     <Equation 3>

<Equation 4>

TABLE 2

| | Capacity retention rate[%] |
|---|---|
| Comparative Example 5 | 10 |
| Comparative Example 6 | 59 |
| Comparative Example 7 | 65 |
| Comparative Example 8 | 66 |
| Example 5 | 76 |
| Example 6 | 78 |
| Example 7 | 87 |
| Example 8 | 97 |

As shown in Table 2, the lithium batteries prepared according to Examples 5 to 8 had higher high-temperature capacity retention rates than the lithium batteries prepared according to Comparative Examples 5 to 8.

As described above, according to the above embodiments of the present invention, use of a cathode active material including a novel lithium manganese composite oxide may contribute to high driving voltage and excellent high-temperature cycle characteristics of a lithium battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode active material comprising a spinel lithium manganese composite oxide represented by Formula 1 below:

$$Li_xMn_{2-y-z}Ni_yM_zO_{4-n}X_n, \quad \text{<Formula 1>}$$

wherein:
0.025≦x≦1.1,
0.3≦y<0.5,
0<z≦0.15,
0<n<1,
M is a metal selected from the group consisting of gallium (Ga), zirconium (Zr), niobium (Nb), molybdenum (Mo), tungsten (W), barium (Ba), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As), and X is a halogen element selected from the group consisting of fluorine (F), chloride (Cl), bromine (Br), and iodine (I).

2. The cathode active material of claim 1, wherein 1.0≦x≦1.1.

3. The cathode active material of claim 1, wherein 0<z≦0.10.

4. The cathode active material of claim 1, wherein 0<n≦0.5.

5. The cathode active material of claim 1, wherein the spinel lithium manganese composite oxide is formed by sintering a mixture comprising a lithium source, a nickel source, a manganese source, an M source, and a halogen source.

6. The cathode active material of claim 1, comprising a spinel lithium manganese composite oxide represented by Formula 2 below:

$$Li_xMn_{2-y-z}Ni_yM_zO_{4-n}F_n, \quad \text{<Formula 2>}$$

wherein:
0.025≦x≦1.1,
0.3≦y<0.5,
0<z≦0.15, and 0<n≦1, and
M is a metal selected from the group consisting of Ga, Zr, Nb, Mo, W, Ba, Sr, La, Ce, Ag, Ta, Hf, Ru, Bi, Sb, Sn, and As.

7. The cathode active material of claim 6, wherein 1.0≦x≦1.1.

8. The cathode active material of claim 6, wherein 0<z≦0.10.

9. The cathode active material of claim 8, wherein the spinel lithium manganese composite oxide is formed by sintering a mixture comprising a lithium source, a nickel source, a manganese source, an M source, and a fluorine source.

10. A cathode comprising the cathode active material of claim 1.

11. A lithium battery comprising the cathode of claim 10.

12. The cathode active material of claim 6, wherein 0<n≦0.15.

13. A cathode comprising the cathode active material of claim 6.

14. A lithium battery comprising the cathode of claim 13.

15. The cathode active material of claim 1, comprising a spinel lithium manganese composite oxide represented by Formula 3 below:

$$Li_xMn_{2-y-z}Ni_yM_zO_{4-n}Cl_n, \quad \text{<Formula 3>}$$

wherein:
0.025≦x≦1.1,
0.3≦y<0.5,
0<z≦0.15, and 0<n≦1, and
M is a metal selected from the group consisting of Ga, Zr, Nb, Mo, W, Ba, Sr, La, Ce, Ag, Ta, Hf, Ru, Bi, Sb, Sn, and As.

16. The cathode active material of claim 1, comprising a spinel lithium manganese composite oxide represented by Formula 4 below:

$$Li_xMn_{2-y-z}Ni_yM_zO_{4-n}Br_n, \quad \text{<Formula 4>}$$

wherein:
0.025≦x≦1.1,
0.3≦y<0.5,
0<z≦0.15, and 0<n≦1, and
M is a metal selected from the group consisting of Ga, Zr, Nb, Mo, W, Ba, Sr, La, Ce, Ag, Ta, Hf, Ru, Bi, Sb, Sn, and As.

17. The cathode active material of claim 1, comprising a spinel lithium manganese composite oxide represented by Formula 5 below:

$$Li_xMn_{2-y-z}Ni_yM_zO_{4-n}I_n, \quad \text{<Formula 5>}$$

wherein:
0.025≦x≦1.1,
0.3≦y<0.5,
0<z≦0.15, and 0<n≦1, and
M is a metal selected from the group consisting of Ga, Zr, Nb, Mo, W, Ba, Sr, La, Ce, Ag, Ta, Hf, Ru, Bi, Sb, Sn, and As.

* * * * *